United States Patent Office 2,785,984
Patented Mar. 19, 1957

2,785,984

FUMIGATION WITH CHLOROFLUOROPROPENES

Eugene E. Kenaga, Midland, Mich., assignor to The Dow Chemical Company, Midland, Mich., a corporation of Delaware No Drawing. Application June 30, 1953, Serial No. 365,247

10 Claims. (Cl. 99—153)

The present invention relates to fumigation and is particularly concerned with an improved method and composition for the fumigation of grain and its milled products for the control of infesting insects, nematodes, bacteria and fungi.

The application of fumigant materials offers an excellent method for the control of infesting bacteria, fungi and insects in grain and its milled products. However, the utilization of such a method has been severely hampered by the inability of many fumigant materials to penetrate in lethal concentrations to any substantial depth in grain and flour. Others of the known fumigant materials have been restricted in use by the disagreeable odor and flavor characteristics which they impart to matter fumigated. Thus, the hazard of off-flavor and ill-smelling grain and flour has curtailed widespread employment of many such materials. These shortcomings of known treatment methods have created special difficulties in the fumigation of grain and its milled products.

It is an object of the present invention to provide a new and improved method of fumigation for the control of nematodes, insects, bacteria and fungi. It is a further object to provide an improved method and composition for the fumigation of grain and its milled products. Another object is the provision of a method and composition which will accomplish superior penetration of grain and its milled products. An additional object is the provision of a method which does not impart an off-taste or offensive odor to fumigated materials or adversely affect the germination of grain. Other objects will become apparent from the following specification and claims.

According to the present invention it has been discovered that matter infected or infested with bacteria, fungi, nematodes, and insects advantageously may be fumigated and the organisms killed by treatment with a monochlorotetrafluoropropene, dichlorotetrafluoropropene, or monochloro-pentafluoropropene. More particularly, it has been discovered that grain and its milled products, and other foodstuffs may be fumigated with or exposed to the vapors of these fluorine compounds to control infesting bacteria, fungi and insects without imparting undesired taste and odor characteristics to the fumigated products. Such fumigation operations are carried out in an enclosed space or otherwise to insure a sufficient period of contact of the fumigant with the infesting organisms. The class of fluorine compounds, as used in accordance with the present invention, include 1-chloro-2,3,3,3-tetrafluoropropene; 2-chloro-1,3,3,3-tetrafluoropropene; 1-chloro-1,2,3,3-tetrafluoropropene-1; 2 - chloro-1,1,3,3-tetrafluoro-propene-1; 3-chloro-1,1,2,3-tetrafluoropropene-1; 1,1-dichloro-2,3,3,3-tetrafluoropropene; 1,2 - dichloro - 1,3,3,3 - tetrafluoropropene; 1,3-dichloro-1,2,3,3-tetrafluoropropene; 2,3-dichloro-1,1,3,3-tetrafluoropropene; 3,3 - dichloro - 1,1,2,3-tetrachloropropene; 3 - chloro - 1,2,3,3-tetrafluoropropene; 3-chloro - 1,1,3,3-tetrafluoropropene; 1-chloro-1,2,3,3,3-pentafluoropropene; 1 - chloro-1,3,3,3-tetrachloropropene; 2-chloro - 1,1,3,3,3 - pentafluoropropene; and 3 - chloro-1,1,2,3,3-pentafluoropropene. These fluorine compounds are non-flammable, gaseous or liquid materials at ordinary temperatures, and boil in the range of from about −10° to 100° C. The compounds are somewhat soluble in many organic solvents but have a very low solubility in water. They are adapted to be easily and conveniently employed for the fumigation of grain and its milled products. The compounds have very desirable penetrating properties which enable their vapors to diffuse through and permeate in parasiticidal concentrations the interstices of grain and its milled products to an extreme depth and within a relatively short period of time.

The exposure of bacteria, fungi, nematodes or insects to at least a minimum effective dosage of the fluorine compounds is essential for the practice of the present invention. In general, this dosage is employed in an enclosed space and amounts to a lethal or parasiticidal concentration. When fumigating grain and its milled products, good results are obtained when the fluorine compounds are employed in an amount corresponding to at least 0.1 pound per thousand cubic feet of space within which the product is enclosed. Alternatively, the fumigation of soil or other growth media may entail the injection of the fluorine compounds or solutions thereof under the surface of the soil followed by rolling or wetting the surface of the treated soil to provide a seal.

In carrying out the present invention, the matter to be fumigated may be fumigated may be exposed to the vapors of the fluorine compounds in any convenient manner. When fumigating grain, the grain is placed in an enclosure together with the required amount of fluorine compound. When the employed fluorine compound is a liquid, it may be poured upon the surface of the grain and/or introduced at various levels therein. If the fluorine compound is a gas at ordinary temperatures, it may be introduced generally into the enclosure or at various levels within the grain. In the fumigation of flour and milled grain products, the latter are generally bagged and thereafter placed in an enclosure together with the required amount of fumigant material in vapor or vaporizable form. In such operations, the liquid fluorine compounds are generally placed in shallow pans or sprayed upon the walls or other surfaces within the enclosure. The liquid fluorine compounds readily volatilize from the surfaces upon which they are distributed to provide the required minimum concentration of 0.1 pound per thousand cubic feet of space. The exposure of the infested material and undesired organisms may be carried out in some other gas than air, e. g. nitrogen or carbon dioxide.

In an alternate method, the fluorine compounds are dissolved or otherwise incorporated in an inert volatile organic solvent such as acetone or volatile liquid haloaliphatic compound or volatile petroleum distillate and the resulting mixtures employed in the manner as previously described. The preferred organic solvent carriers are those of such volatility that they evaporate from the matter treated and leave little permanent residue therein. The exact concentration of the fluorine compounds to be employed in these solvent fumigant compositions is not critical. The required dosage of the fluorine compounds generally may be supplied with compositions containing from 1 to 90 percent by weight of toxicant.

A preferred embodiment of the invention consists of a petroleum distillate solution of the fluorine compounds. The petroleum distillates to be employed in such embodiment are carefully cut portions boiling almost entirely under 400° F. at atmospheric pressure and having a flash point above about 80° F. These fumigant compositions are of particular value for the fumigation of soil and are characterized by having excellent penetrating properties.

In another preferred embodiment, the fluorine compounds are incorporated in low boiling volatile organic solvents, which change to gases when released from a confied space, to prepare self-propellant fumigant compositions. Such compositions may be prepared by mixing a liquefied gas such as carbon dioxide, dichlorodifluoromethane, methyl chloride, etc. with the fluorine compound in a sealed container or cylinder. These self-propellant compositions are of particular value and convenience for the fumigation of foodstuffs normally packaged in cellulosic or plastic wrappers.

Other materials which may be combined with the fluorine compounds, either as volatile solvents or as supplementary toxicants or both, include carbon tetrachloride, ethylene bromide, ethylene chloride, hydrogen cyanide, trichlorobromomethane, carbon bisulfide, acrylonitrile, tetrachloroethylene, trichloromethylene, chloropicrin, methylbromide, $\beta,\beta'$-dichloroethyl ether and propylene chloride. These compositions are of outstanding value for the fumigation of infested material where superior penetrating properties are desired. Alternatively such compositions may be dissolved or otherwise incorporated in an inert organic solvent and the latter composition employed in the present method as previously described.

According to the present invention, grain and its milled products are generally exposed to the vapors for a period of at least two hours or longer, the exact period of time being dependent upon the nature and size of the treating chamber and the ease with which the vapors may penetrate the product to be fumigated, e. g., whether grain or flour is concerned. In small enclosures, exposures from a few minutes to a few hours may be sufficient to accomplish penetration and the killing of the organisms. In large enclosures and with large quantities of grain and its milled products, periods up to 72 hours or longer may be desirable.

The following examples illustrate the invention and are not to be construed as limiting:

*Example 1*

Various of the fluorine compounds were separately employed for the fumigation of an enclosure, the interior walls and surfaces of which were infested with adult confused flour beetles (*Tribolium confusum*). In such operations, measured amounts of the vapors of the compounds were introduced into the enclosures and the interior surfaces of the latter and their infesting organisms thereafter exposed to these vapors for a period of sixteen hours and at a temperature of about 75° F. The following table sets forth the nature of the compounds and the concentrations at which they were employed together with the controls of *Tribolium confusum* obtained.

| Fumigant Material | Concentration in Pounds per 1,000 cu. ft. | Percent Mortality |
| --- | --- | --- |
| 2-chloro-1,1,3,3,3-pentafluoropropene (boiling at 6.45° C. at 760 mm. pressure) | 0.5 | 100 |
| 3-chloro-1,1,2,3,3-pentafluoropropene (boiling at 7.5° C. at 760 mm. pressure) | 0.5 | 100 |
| 3-chloro-1,1,3,3-tetrafluoropropene (boiling at 13.62° C. at 760 mm. pressure) | 0.25 | 100 |
| 2,3-dichloro-1,1,3,3-tetrafluoropropene (boiling at 44.7° C. at 760 mm. pressure) | 0.12 | 100 |
| 1,3-dichloro-1,2,3,3-tetrafluoropropene (boiling at 43.5° C. at 760 mm. pressure) | 0.5 | 100 |
| 1,2-dichloro-1,3,3,3-tetrafluoropropene (boiling at 47.3° C. at 760 mm. pressure) | 0.5 | 100 |

*Example 2*

In an exactly similar operation, various of the fluorine compounds were separately employed for the control of black carpet beetle pupae (*Attagenus piceus*). The following table sets forth the results obtained.

| Fumigant Material | Concentration in Pounds per 1,000 cu. ft. | Percent Mortality |
| --- | --- | --- |
| 2-chloro-1,1,3,3,3-pentafluoropropene | 0.5 | 100 |
| 3-chloro-1,1,2,3,3-pentafluoropropene | 0.25 | 100 |
| 3-chloro-1,1,3,3-tetrafluoropropene | 0.5 | 100 |
| 2,3-dichloro-1,1,3,3-tetrafluoropropene | 0.5 | 100 |
| 1,3-dichloro-1,2,3,3-tetrafluoropropene | 0.5 | 100 |
| 1,2-dichloro-1,3,3,3-tetrafluoropropene | 0.5 | 100 |

*Example 3*

Various of the fluorine compounds were separately employed for the fumigation of corn. In such operations, the corn was placed in a fumigant chamber together with a measured amount of the fluorine compound and the corn then mixed for a period of time to accomplish distribution through the corn of the vapors of the compound. Following the agitation period, adult confused flour beetles and granary weevils (*Sitophilus granarius*) were introduced into the grain and the exposure to the vapors thereafter continued for a period of 16 hours. The nature of the compounds and the concentrations at which they were employed together with the controls obtained are set forth in the following table.

| Fumigant Material | Concentration In Pounds per 1,000 cu. ft. | Percent Mortality Confused Flour Beetles | Percent Mortality Granary Weevils |
| --- | --- | --- | --- |
| 2-chloro-1,1,3,3,3-pentafluoropropene | 1.0 | 100 | 100 |
| 1,2-dichloro-1,3,3,3-tetrafluoropropene | 1.0 | 100 | 100 |
| 3-chloro-1,1,3,3-tetrafluoropropene | 2.0 | 100 | 100 |
| 2,3-dichloro-1,1,3,3-tetrafluoropropene | 1.0 | 100 | 100 |

Two weeks after the fumigation, no evidence of off-taste or offensive odor, attributable to the action of the fluorine compounds, is found in the fumigated corn.

*Example 4*

1,1-dichloro-2,3,3,3-tetrafluoropropene (boiling at 46.4° C. at 160 mm. pressure) is introduced into an airtight bin containing wheat stored to a depth of about 10 feet. The fluorine compound is poured upon the surface of the wheat in an amount sufficient to provide a concentration of 2 pounds per 1000 cubic feet of enclosure. Prior to the introduction of the fumigant, the wheat is infested at different levels with adult confused flour beetles. After three days exposure at an average temperature of 70° F., a complete kill of the insects is observed at all levels in the wheat. One week following the exposure, no off-taste or offensive odor, attributable to the action of the fluorine compound, is found in the treated wheat.

*Example 5*

The fluorine compounds were separately employed for the fumigation of wheat flour. In such operations, the flour was placed in a fumigant chamber and measured quantities of the vapors of the fluorine compounds introduced into the chamber to provide the desired toxicant concentrations. Prior to the introduction of the toxicant, the flour was infested with adult confused flour beetles and black carpet beetle larvae at a depth of about 9 inches within the finely milled product. In each determination, the flour was exposed to the vapors of the employed compound for about 16 hours at a temperature of about 75° F. The following table sets forth the results obtained.

| Fumigant Materials | Concentration in Pounds Per 1000 cu. feet | Percent Mortality at a Depth of Nine Inches | |
|---|---|---|---|
| | | Confused Flour Beetles | Black Carpet Beetles |
| 2 - chloro - 1,1,3,3,3 - pentafluoropropene | 0.5 | 100 | 100 |
| 1,2 - dichloro - 1,3,3,3 - tetrafluoropropene | 1.0 | 100 | 100 |
| 2,3 - dichloro - 1,1,3,3 - tetrafluoropropene | 1.0 | 100 | 100 |
| 3 - chloro - 1,1,2,3,3 - pentafluoropropene | 0.5 | 100 | 100 |
| 3 - chloro - 1,1,3,3 - tetrafluoropropene | 0.5 | 100 | 100 |
| 1,3 - dichloro - 1,2,3,3 - tetrafluoropropene | 1.0 | 100 | 100 |

Sensory examination and inspection of the flour, one week following the exposure, showed no evidence of off-taste or offensive odor attributable to the action of the propene compounds.

Example 6

1-chloro-2,3,3,3-tetrafluoropropene (boiling at 15° C. at 760 mm. pressure) is introduced into an air-tight bin of rice in an amount sufficient to provide a concentration of 2.4 pounds per 1000 cubic feet of enclosure. The rice is stored in the bin to a depth of about 10 feet. Prior to the introduction of the propene compound, the rice is infested at different levels with confused flour beetles and black carpet beetles. After 72 hours exposure at an average temperature of about 74° F., a complete kill of the insects is observed at all levels in the rice. One week after the exposure, no offensive odor or off-taste, attributable to the fumigation operations, is found in the rice.

Example 7

A fumigant composition, having a flash point greater than 100° F., is prepared by mixing together 20 percent by volume of 1,3-dichloro-1,2,3,3-tetrafluoropropene and 80 percent of a petroleum fraction commonly known as Stoddards solvent. The latter solvent has a boiling range of from 325° to 400° F. and a flash point of about 116° F. This composition is employed for the treatment of a seed bed containing a sandy loam soil which is heavily infested with root knot nematodes. In the treating operations, the distribution is accomplished by injecting the fumigant mixture into the soil in rows 8 inches apart, the injections being made at 4 inch intervals and at a depth of about 6 inches below the soil surface. The amount of fumigant material employed is sufficient to supply 150 pounds of toxicant per acre. Following the distribution of the fumigant, the soil surface is sealed with about one acre inch of water.

One month later, the seed bed is planted with tomato seeds. Three weeks after planting, the tomato seedlings are lifted from the soil, their roots washed and the latter examined for gall formation attributable to nematode attack. As a result of these operations, there is found a commercial control of nematodes.

Example 8

3,3-dichloro-1,1,2,3-tetrafluoropropene (boiling at 47.3° C. at 760 mm. pressure) is mixed with dichlorodifluoromethane to prepare a self-propellant fumigant composition containing 5 percent by weight of the propene compound. This composition is employed for the line fumigation of dried prunes packaged in sealed bags of Saran film. In such operations, the composition is dispersed from a pressure container equipped with a metering valve discharging a measured portion of the fumigant mixture through a needle orifice into each packaged food container to provide in each package a concentration of the propene compound equivalent to 0.2 pound per 1000 cubic feet. Following the introduction of the fumigant, the discharge needle is withdrawn from the bag and the perforation therein sealed. The fumigated prunes and unfumigated but similarly packaged prunes are then stored at an average temperature of about 70° F. After one month of storage, various of the fumigated and unfumigated packages are selected at random and examined for the development of mold and mildew on the packaged contents. The examination shows a commercial control of mildew and mold in the fumigated prunes with many of the unfumigated and packaged prunes showing a heavy growth of these organisms.

Example 9

Wheat was separately fumigated with 2-chloro-1,1,3,3,-3-pentafluoropropene, 1,2-dichloro-1,3,3,3-tetrafluoropropene, 3-chloro-1,1,3,3-tetrafluoropropene, 2,3-dichloro-1,1,3,3-tetrafluoropropene, 3-chloro-1,1,2,3,3-pentafluoropropene and 1,3-dichloro-1,2,3,3-tetrafluoropropene at dosages of 3, 3, 1, 1, 3 and 3 pounds, respectively, per 1000 cubic feet. In such operations, portions of wheat were separately exposed in a fumigation chamber to the vapors of the compounds for a period of about 16 hours and at the above indicated concentrations. Following the exposure, determinations were carried out with the fumigated wheat and with unfumigated wheat to ascertain whether or not the treatments had adversely affected germination. The determinations showed that the fumigation operations had not adversely affected the germination of the wheat.

Example 10

3-chloro-1,2,3,3-tetrafluoropropene is introduced into an air-tight bin of oats in an amount sufficient to provide a concentration of 1.5 pounds of the vapors of the fluorine compound per 1000 cubic feet. The oats are stored in the bins to a depth of about 6 feet. Prior to the introduction of the propene compound, the oats are infested at different levels with adult confused flour beetles. After 72 hours exposure at an average temperature of 75° F., a complete kill of the infesting insects is observed at all levels in the oats. One week after the exposure, no offensive odor or off-taste, attributable to the fumigation operations, is found in the oats.

The dichloro-tetrafluoropropenes and the monochloropentafluoropropenes as herein described are known compounds. Methods for their preparation and for the preparation of 1-chloro-2,3,3,3-tetrafluoropropene are disclosed in the Journal American Chemical Society, vol. 61, 63, 68 and 70 and in "Organic Reactions," vol. 2, published in 1944 by John Wiley and Sons, London.

The monochloro-tetrafluoropropenes as employed in accordance with the present invention may be prepared by known methods. For example, 1,2,3-trichloro-1,1,3,3-tetrafluoropropane may be dechlorinated with zinc in the presence of absolute alcohol as reaction solvent to produce 3-chloro-1,1,3,3-tetrafluoropropene.

In a similar manner, 1,1,2,3-tetrachloro-1,3,3-trifluoropropane may be dechlorinated with zinc and the resulting 1,3-dichloro-1,3,3-trifluoropropene thereafter fluorinated with a mixture of antimony trichloride and antimony pentachloride to produce 1-chloro-1,3,3,3-tetrafluoropropene.

In the preparation of 1-chloro-1,2,3,3-tetrafluoropropene-1, 1,1,2-trichloro-3,3-difluoropropene-1 may be treated with hydrogen fluoride and lead oxide to fluorinate the double bond and obtain a 1,1,2-trichloro-1,2,3,3-tetrafluoropropane product. Dechlorination of the latter product with alcoholic zinc gives the desired propene compound.

Dechlorination of 1,2,3-trichloro-1,2,3,3-tetrafluoropropane with zinc in the presence of absolute alcohol gives a 3-chloro-1,2,3,3-tetrafluoropropene product.

In the preparation of 2-chloro-1,1,3,3-tetrafluoropropene-1, 1,1,2-trichloro-3,3-difluoropropene-1 may be chlorinated with gaseous chlorine to prepare a 1,1,1,2,2- pentachloro-3,3-difluoropropane intermediate. Fluorination of the latter intermediate with an antimony trifluoride-antimony pentachloride mixture yields a 1,2,2-trichloro-1,1,3,3-tetrafluoropropane compound which may be dechlorinated with alcoholic zinc to obtain the desired propene product.

Fluorination of the above 1,2,2-trichloro-1,1,3,3-tetrafluoropropane compound with an antimony chlorofluoride ($SbF_3Cl_2$) yields a 1,2-dichloro-1,1,2,3,3-pentafluoropropane product which may be dechlorinated with alcoholic zinc to produce 1,1,2,3,3-pentafluoropropene-1. The latter compound may be treated with aluminum trichloride to prepare 3-chloro-1,1,2,3-tetrafluoropropene-1.

In a similar manner, 1,1,2,3,3-pentachloropropene-1 may be fluorinated with antimony trifluoride with the production of a 1,1,2,3-tetrachloro-3-fluoropropene-1 product which may be chlorinated with gaseous chlorine to 1,1,1,2,2,3-hexachloro-3-fluoropropane. Fluorination of the latter product with an antimony trifluoride-antimony pentachloride mixture yields a 1,2,2,3-tetrachloro-1,1,3-trifluoropropane product which may be dechlorinated with alcoholic zinc and thereafter fluorinated with the above antimony mixture to obtain a 2-chloro-1,3,3,3-tetrafluoropropene product.

I claim:

1. A method for controlling insects, bacteria, nematodes and fungi which includes the step of exposing matter infested with these organisms to a lethal concentration of the vapors of a member of the group consisting of the monochloro-tetrafluoropropenes, dichlorotetrafluoropropenes and monochloro-pentafluoropropenes.

2. A method which comprises the step of fumigating grain and its milled products with a member of the group consisting of the monochloro-tetrafluoropropenes, dichloro-tetrafluoropropenes and monochloro-pentafluoropropenes.

3. A method which comprises the step of exposing grain and its milled products to the vapors of a member of the group consisting of the monochloro-tetrafluoropropenes, dichloro-tetrafluoropropenes and monochloro-pentafluoropropenes, the exposure being carried out in an enclosed space and with an amount of fluorine compound sufficient to provide a concentration of at least 0.1 pound per 1000 cubic feet of said enclosed space.

4. A method which comprises treating grain and its milled products with a composition made up of an organic fluorine compound as an essential active ingredient uniformly associated with an inert diluent as a carrier therefor, the treatment being carried out in an enclosed space at a dosage of at least 0.1 pound of the fluorine compound per 1000 cubic feet of said space and the active ingredient being a member of the group consisting of the mono-chloro-tetrafluoropropenes, dichlorotetrafluoropropenes, and monochloro-pentafluoroprenes.

5. The methd claimed in claim 3, wherein the fluorine compound is 2-chloro-1,1,3,3,3-pentafluoropropene.

6. The method claimed in claim 3, wherein the fluorine compound is 1,2-dichloro-1,3,3,3-tetrafluoropropene.

7. The method claimed in claim 3, wherein the fluorine compound is 2,3-dichloro-1,1,3,3-tetrafluoropropene.

8. The method claimed in claim 3, wherein the fluorine compound is 3-chloro-1,1,2,3,3-pentafluoropropene.

9. The method claimed in claim 3 wherein the fluorine compound is 1,3-dichloro-1,2,3,3-tetrafluoropropene.

10. A composition comprising as an active ingredient a member of the group consisting of the monochloro-tetrafluoropropenes, dichloro-tetrafluoropropenes, and monochloro-pentafluoropropenes dissolved in a volatile organic solvent, the active ingredient being present in the amount of at least 1 percent by weight.

References Cited in the file of this patent

UNITED STATES PATENTS

| | | |
|---|---|---|
| 1,956,620 | O'Daniel | May 1, 1934 |
| 2,424,520 | Tonkin | July 22, 1947 |
| 2,673,173 | Ruh | Mar. 23, 1954 |

FOREIGN PATENTS

| | | |
|---|---|---|
| 920,161 | France | Jan. 2, 1947 |

OTHER REFERENCES

U. S. D. A. Tech. Bull. 162, March 1929, pages 1, 2, 36, 46, and 47.